(12) United States Patent
Yata et al.

(10) Patent No.: US 11,249,343 B2
(45) Date of Patent: Feb. 15, 2022

(54) DISPLAY DEVICE COMPRISING AN ILLUMINATION DEVICE HAVING A LIGHT DIFFUSION LAYER EXHIBITING A FIRST DIFFUSION DEGREE IN A FIRST DIRECTION WHICH IS DIFFERENT THAN A SECOND DIFFUSION DEGREE IN A SECOND DIRECTION

(71) Applicant: Japan Display Inc., Tokyo (JP)

(72) Inventors: Tatsuya Yata, Tokyo (JP); Shigenori Aoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/181,148

(22) Filed: Feb. 22, 2021

(65) Prior Publication Data

US 2021/0173257 A1    Jun. 10, 2021

Related U.S. Application Data

(63) Continuation of application No. 15/803,104, filed on Nov. 3, 2017, now Pat. No. 10,928,671.

(30) Foreign Application Priority Data

Nov. 14, 2016 (JP) .............................. JP2016-221767

(51) Int. Cl.
*G02F 1/13357*    (2006.01)
*F21V 8/00*    (2006.01)

(52) U.S. Cl.
CPC ..... *G02F 1/133606* (2013.01); *G02B 6/0051* (2013.01); *G02F 1/133602* (2013.01); *G02F 1/133603* (2013.01); *G02B 6/0068* (2013.01)

(58) Field of Classification Search
CPC ......... G02F 1/133602; G02F 1/133524; G02B 6/0015; G02B 6/0063; G02B 2006/1218; G02B 6/0076
See application file for complete search history.

(56) References Cited

U.S. PATENT DOCUMENTS 7,403,332 B2    7/2008  Whitehead et al.
8,026,895 B2    9/2011  Yoshida
(Continued)

FOREIGN PATENT DOCUMENTS

JP    2005-001506 A    1/2005
JP    2008059863 A     3/2008
(Continued)

OTHER PUBLICATIONS

Japanese Office Action dated Apr. 7, 2020 in corresponding Japanese Application No. 2016-221767.

*Primary Examiner* — Paul C Lee
(74) *Attorney, Agent, or Firm* — K&L Gates LLP

(57) ABSTRACT

A display device is provided and includes display panel; and illumination device opposed to display panel, illumination device including first light guide, second light guide arranged adjacent to first light guide in first direction, third light guide arranged adjacent to first light guide in second direction intersecting first direction, and fourth light guide arranged adjacent to second light guide in the second direction, light diffusion layer disposed between display panel and each of the first, second, third, and fourth light guides, wherein light diffusion layer exhibit first diffusion degree in first direction and second diffusion degree in second direction, second diffusion degree is different from the first diffusion degree, illumination device includes first ridge between first and second light guides and second ridge between first and third light guides, and under light diffusion layer, first brightness in first ridge is different from second brightness in second ridge.

21 Claims, 15 Drawing Sheets

(56) References Cited

U.S. PATENT DOCUMENTS

| | | | |
|---|---|---|---|
| 2004/0062040 A1* | 4/2004 | Blume | G02F 1/133603 |
| | | | 362/231 |
| 2006/0114690 A1 | 6/2006 | Iki et al. | |
| 2010/0039440 A1 | 2/2010 | Tanaka et al. | |
| 2010/0253881 A1* | 10/2010 | Han | G02F 1/133615 |
| | | | 349/65 |
| 2016/0259209 A1 | 9/2016 | Ito | |

FOREIGN PATENT DOCUMENTS

| | | |
|---|---|---|
| JP | 2011090949 A | 5/2011 |
| JP | 2012-038431 A | 2/2012 |
| WO | 2015064105 A1 | 5/2015 |

\* cited by examiner

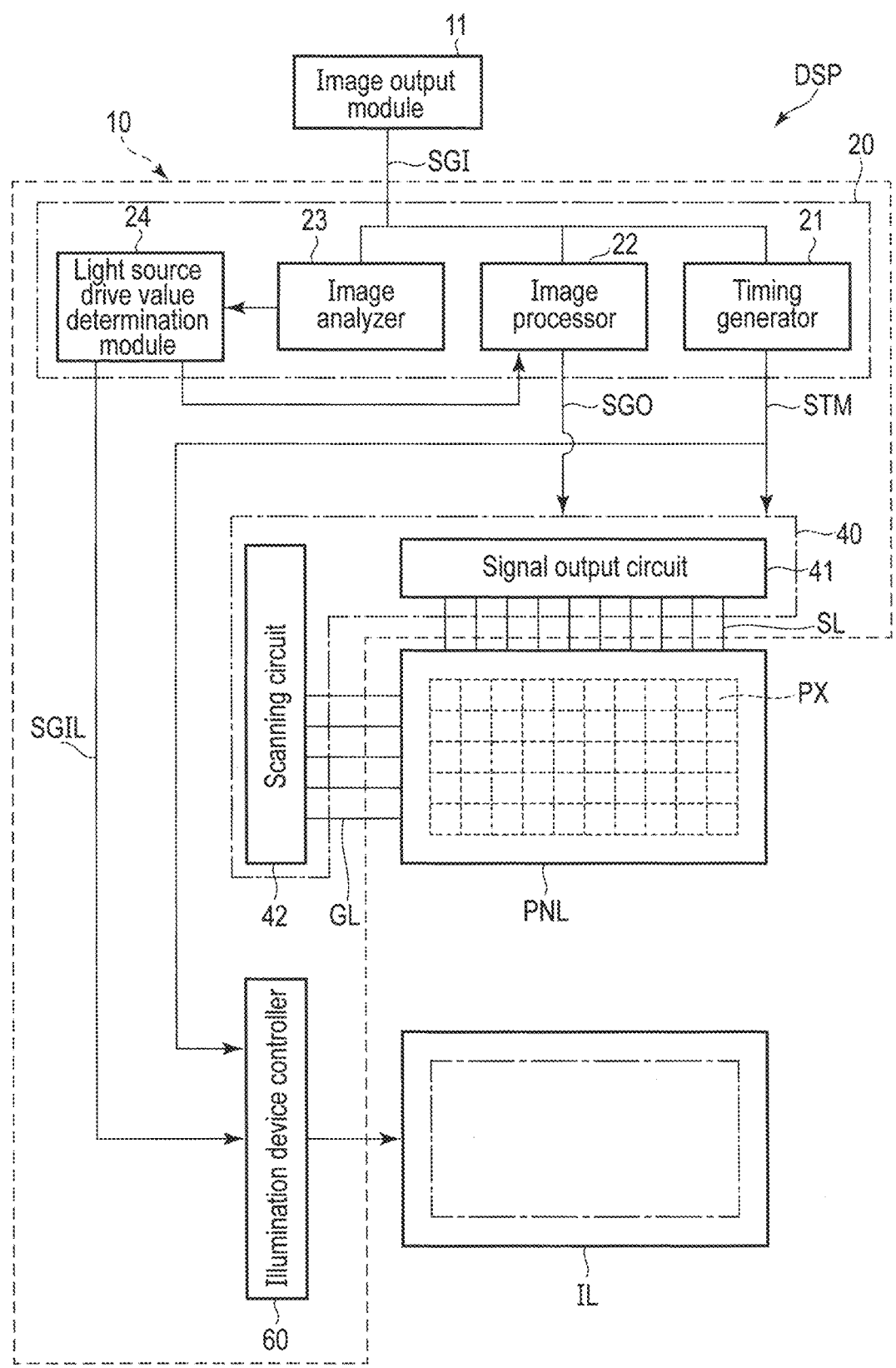
F I G. 1

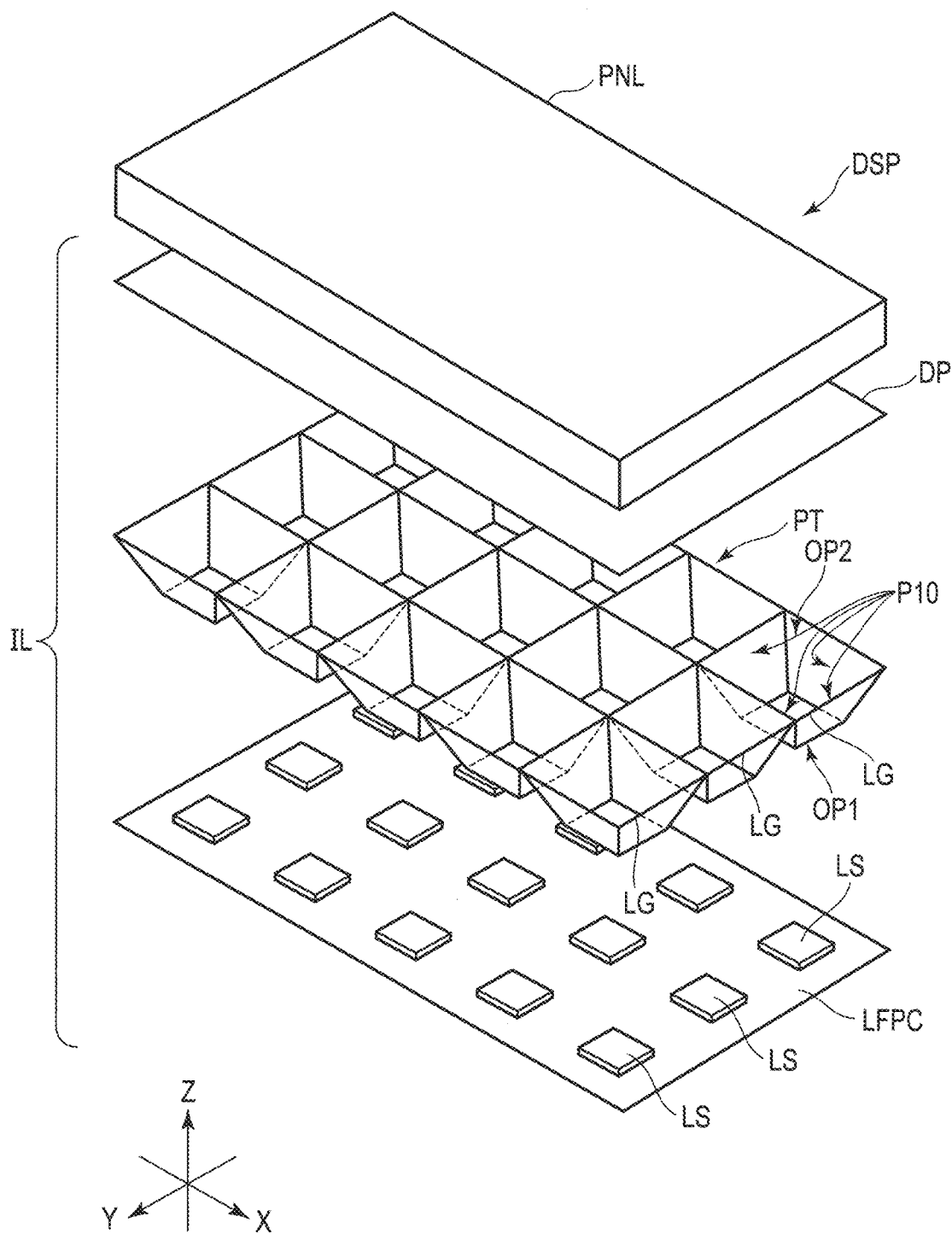
F I G. 4

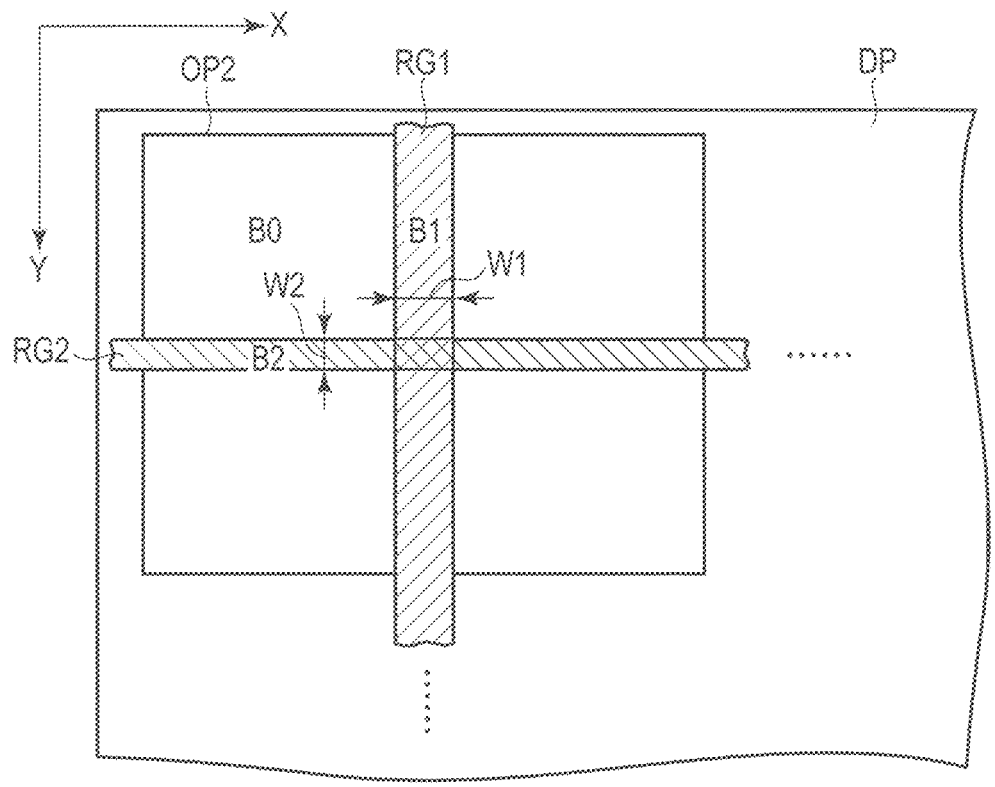

FIG. 10

| | B1 | B2 | Diffusion degree of light diffusion layer |
|---|---|---|---|
| Sample 1 | Dark(B1<B0) | Bright(B2>B0) | First direction > Second direction |
| Sample 2 | Bright(B1>B0) | Dark(B2<B0) | First direction < Second direction |
| Sample 3 | Bright | Bright(B0<B2<B1) | First direction > Second direction |
| Sample 4 | Bright | Bright(B0<B1<B2) | First direction < Second direction |
| Sample 5 | Dark | Dark(B2<B1<B0) | First direction < Second direction |
| Sample 6 | Dark | Dark(B1<B2<B0) | First direction > Second direction |

FIG. 11A

DISPLAY DEVICE COMPRISING AN ILLUMINATION DEVICE HAVING A LIGHT DIFFUSION LAYER EXHIBITING A FIRST DIFFUSION DEGREE IN A FIRST DIRECTION WHICH IS DIFFERENT THAN A SECOND DIFFUSION DEGREE IN A SECOND DIRECTION

CROSS-REFERENCE TO RELATED APPLICATIONS

This application is a continuation of U.S. patent application Ser. No. 15/803,104, filed on Nov. 3, 2017, which application is based upon and claims the benefit of priority from Japanese Patent Application No. 2016-221767, filed Nov. 14, 2016, the entire contents of which are incorporated herein by reference.

FIELD

Embodiments described herein relate generally to a display device and an illumination device.

BACKGROUND

As a type of display device, a structure comprising a liquid crystal display panel and a backlight provided with a light source directly thereunder has been put into practical use. In an example of such a device, a technology has been proposed, which substantially equalizes the total intensity of light when all the light sources adjacent to each other in the backlight are on. Meanwhile, in the field of head-up displays, such a technology has been proposed as to judge the range of images to be displayed and turn on the light sources of the corresponding region, thereby reducing the consumption power and suppressing the generation of heat.

SUMMARY

The present disclosure generally relates to a display device and an illumination device. According to one embodiment, a display device includes a display panel including a first sub-display area and a second sub-display area and an illumination device which illuminates the display panel, the illumination device including a first light guide opposing the first sub-display area, a second light guide opposing the second sub-display area, and a light diffusion layer disposed between the display panel and each of the first light guide and the second light guide, the light diffusion layer exhibiting a first diffusion degree in a first direction along which the first light guide and the second light guide are arranged, which is higher than a second diffusion degree in a second direction crossing the first direction.

Additional features and advantages are described herein, and will be apparent from the following Detailed Description and the figures.

BRIEF DESCRIPTION OF THE DRAWINGS

FIG. 1 is a block diagram showing a structure of a display device according to this embodiment.

FIG. 4 is an exploded perspective view of the display device of this embodiment.

FIG. 10 is a diagram illustrating the relationship between the brightness in an opening, the brightness in a first ridge and the brightness in a second ridge.

FIG. 11A is a diagram showing the comparison in brightness, and the relationship between the comparison and a degree of diffusion of the light diffusion layer adapted in each sample.

DETAILED DESCRIPTION

Figure 2:
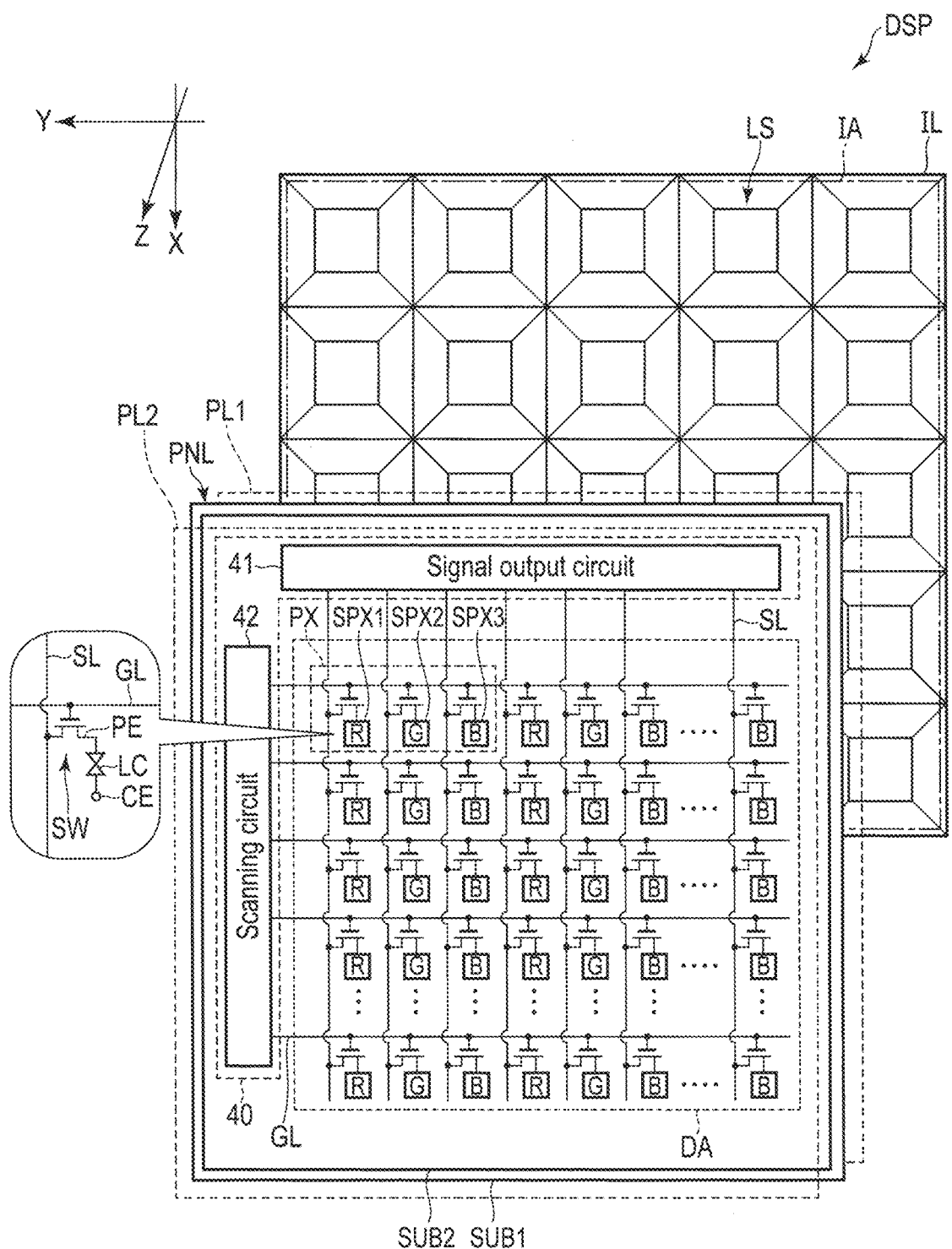
FIG. 2 is a diagram showing a configuration example of each of an illumination device and a display panel applicable to this embodiment.

With regard to the above-described techniques, while a light source array in which a plurality of light sources are arranged at predetermined intervals is being driven, non-uniformity in brightness between adjacent light sources, which may be caused by a low-intensity dark line and a high-intensity bright line, needs to be suppressed. Further, in a display device comprising such an illumination device, degradation of the display quality, which may be caused by the non-uniformity in brightness of the illumination device, needs to be suppressed.

According to one embodiment, a display device comprising: a display panel comprising a first sub-display area and a second sub-display area; and an illumination device which illuminates the display panel, the illumination device comprising: a first light guide opposing the first sub-display area, a second light guide opposing the second sub-display area, and a light diffusion layer disposed between the display panel and each of the first light guide and the second light guide, the light diffusion layer exhibiting a first diffusion degree in a first direction along which the first light guide and the second light guide are arranged, which is higher than a second diffusion degree in a second direction crossing the first direction.

According to another embodiment, a display device comprising a display panel comprising a first sub-display area, a second sub-display area, a third sub-display area and a fourth sub-display area; and an illumination device which illuminates the display panel, the illumination device comprising a first light guide opposing the first sub-display area a second light guide opposing the second sub-display area and adjacent to the first light guide in a first direction; a third light guide opposing the third sub-display area and adjacent to the first light guide in a second direction crossing the first direction; and a fourth light guide opposing the fourth sub-display area and adjacent to the second light guide in the second direction a light diffusion layer disposed between the display panel and each of the first light guide and the second light guide a first ridge between the first light guide and the second light guide a second ridge between the first light guide and the third light guide, the first light guide comprising an opening opposing the light diffusion layer, a length of a first side of the opening along the first direction being greater than a length of a second side along the second direction, and a first width of the first ridge being greater than a second width of the second ridge.

According to still another embodiment, an illumination device comprising a first light guide; a second light guide; and a light diffusion layer opposing the first light guide and the second light guide, the light diffusion layer exhibiting a first diffusion degree in a first direction, along which the first light guide and the second light guide are arranged, which is greater than a second diffusion degree in a second direction crossing the first direction.

Embodiments will now be described with reference to accompanying drawings. Note that the disclosure is presented for the sake of exemplification, and any modified example and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and Figures of the present application, structural elements having the same or similar functions will be referred to by the same reference numbers and detailed explanations of them that are considered redundant may be omitted.

First, a display device according to this embodiment will be described in detail.

FIG. 1 is a block diagram showing a structure of a display device DSP according to this embodiment. FIG. 1 shows, for example, a display device which can be subjected to local dimming control.

As shown in FIG. 1, the display device DSP comprises a controller 10, a display panel PNL, an illumination device IL that illuminates the display panel PNL and an image output module 11 which outputs signals of images to the controller 10.

The display panel PNL comprises a plurality of pixels PX arranged in a matrix. As will be described later, each pixel PX comprises a plurality of subpixels and each subpixel comprises switching elements and the like arranged therein.

The controller 10 comprises a signal processor 20, a display panel driver 40 which controls the drive of the display panel PNL and an illumination device controller 60 which controls the drive of the illumination device IL.

Hereafter, an example of the control will be briefly described. The signal processor 20 is coupled to the display panel driver 40 and the illumination device controller 60. As shown in FIG. 1, an input signal SGI, which is data of an image to display, is input to the signal processor 20 from an external image output module 11. The signal processor 20 processes the input signal SGI input from the image output module 11 and generates an output signal SGO, an illumination device control signal SGIL and a synchronization signal STM. The signal processor 20 outputs the generated output signal SGO and synchronization signal STM to the display panel driver 40, and outputs the generated illumination device control signal SGIL to the illumination device controller 60. Here, the signal processor 20 corresponds to the operation processor which controls the operations of the display panel PNL and the illumination device IL.

More specifically, the signal processor 20 comprises a timing generator 21, an image processor 22, an image analyzer 23 and a light source drive value determination module 24. The timing generator 21 synchronizes the drive of the illumination device IL with the image displayed on the display panel PNL. That is, the timing generator 21, by processing the input signal SGI, transmits the synchronization signal STM for synchronizing the timing of the display panel PNL and the illumination device IL for every one-frame period to the display panel driver 40 and the illumination device controller 60.

The image processor 22 executes processing to display the on the display panel PNL according to the drive of the illumination device IL. That is, the image-processor 22 generates the output signal SGO for determining the display gradation of each subpixel by processing the input signal SGI, and processes the display data to be output to the display panel driver 40 so as to display the image according to the drive of the light source.

The image analyzer 23, by processing the input signal SGI, analyzes the image displayed for each of divided areas of the illumination device IL (which is sub-illumination areas IA11, IA12, . . . , described later). The light source drive value determination module 24 determines the drive value of each light source based on the data analyzed by the image analyzer 23 and transmits the data on the luminance for each subpixel to the image-processor 22. The module further controls the illumination device controller 60.

The display panel PNL displays the image based on the output signal SGO output from the signal processor 20. The display panel driver 40 comprises a signal output circuit 41 and a scanning circuit 42. The signal output circuit 41 is electrically connected to the display panel PNL via a signal line SL. The scanning circuit 42 is electrically connected to the display panel PNL through a scanning line GL. The display panel driver 40 holds video signals by the signal output circuit 41, and outputs the signals sequentially to the display panel PNL. Further, the display panel driver 40 selects subpixels in the display panel PNL by the scanning circuit 42, and controls the turning on/off of the switching element for controlling the operation (optical transmittance) of the subpixels.

FIG. 2 is a diagram showing a configuration example of the illumination device IL and the display panel PNL applicable to this embodiment.

In the figure, a first direction X, a second direction Y and a third direction Z are orthogonal to each other, but they may cross at an angle other than 90 degrees. An X-Y plane defined by the first direction X and the second direction Y is parallel to the main surfaces of optical components such as the display panel PNL and the illumination device IL, and the third direction Z is equivalent to a stacking direction of the illumination device IL and the display panel PNL or a traveling direction of the light emitted from the illumination device IL.

In the example illustrated, the display panel PNL is a liquid crystal display panel and comprises a first substrate SUB1, a second substrate SUB2 and a liquid crystal layer LC held between the first substrate SUB1 and the second substrate SUB2. In the example illustrated, the display device DSP comprises a polarizer PL1 located on a rear side of the first substrate SUB1 and a polarizer PL2 located on a front side of the second substrate SUB2. For example, optical absorption axes of the polarizers PL1 and PL2 are orthogonal to each other in the X-Y plane. Note here that the side on which the illumination device IL is disposed as seen from the display panel PNL is defined as the rear side, and an opposite side to the rear side of the display panel PNL is defined as the front side.

The display panel PNL comprises a display area DA which displays images. The display panel PNL comprises a plurality of pixels PX arranged in the display area DA in a matrix along the first direction X and the second direction Y. The pixels PX each includes, for example, a first subpixel SPX1, a second subpixel SPX2, and a third subpixel SPX3. The first subpixel SPX1 is provided with, for example, a red filter and it displays red. The second subpixel SPX2 is provided with, for example, a green filter and it displays green. The third subpixel SPX3 is provided with, for example, a blue filter and it displays blue.

The first substrate SUB1 comprises a plurality of scanning lines GL (also referred to as gate lines) and a plurality of signal lines SL (also referred to as data wiring lines or source lines) which cross the scanning lines GL. Each scanning line GL is drawn to an outer side of the display area DA and is connected to the scanning circuit 42. Each signal line SL is drawn to an outer side of the display area DA and is connected to the signal output circuit 41. The scanning circuit 42 and the signal output circuit 41 are controlled based on the image data for displaying images on the display area DA.

Each subpixel comprises a switching element SW (for example, a thin film transistor), a pixel electrode PE, a common electrode CE, etc. The switching element SW is electrically connected to a scanning line GL and a signal line SL. The pixel electrode PE is electrically connected to the switching element SW. The common electrode CE opposes a plurality of pixel electrodes PE. The pixel electrode PE and the common electrode CE function as drive electrodes which drive the liquid crystal layer LC. The pixel electrode PE and the common electrode CE are formed from, for example, a transparent conductive material such as indium tin oxide (ITO) or indium zinc oxide (IZO).

The illumination device IL is disposed on a rear surface side of the display panel PNL and emits light towards the display panel PNL. The illumination device IL comprises an illumination area IA which opposes the display area DA. The illumination device IL comprises light sources LS arranged in a matrix in the illumination area IA. Here, the light sources LS are light-emitting diodes which emits white light, for example, but they are not limited to these. As the light source LS which emits white light, for example, a type in which light emitting diodes which respectively emit red, green and blue are formed into a single chip or a type in which light-emitting diodes which emit blue or near ultra-violet and phosphors are combined is applicable. The light sources LS with such a configuration can control the brightness according to the size of the current supplied.

For example, one light source LS is disposed to oppose a sub-display region comprising m×n pixels PX. Here, m and n are positive integers, m corresponds to the number of pixels PX arranged along the first direction X, and n corresponds to the number of pixels PX arranged along the second direction Y. Each of the light sources LS can be individually controlled to be turned on/off. With this structure, the illumination device IL can form sub-illumination areas in the illumination area IA, which can be turned on/off individually. The sub-illumination areas each comprise at least one light source LS. Each sub-illumination area can be formed into various forms such as a belt-like shape elongated along the first direction X or the second direction Y, a matrix shape arranged along the first direction X and the second direction Y in the X-Y plane.

Figure 3:
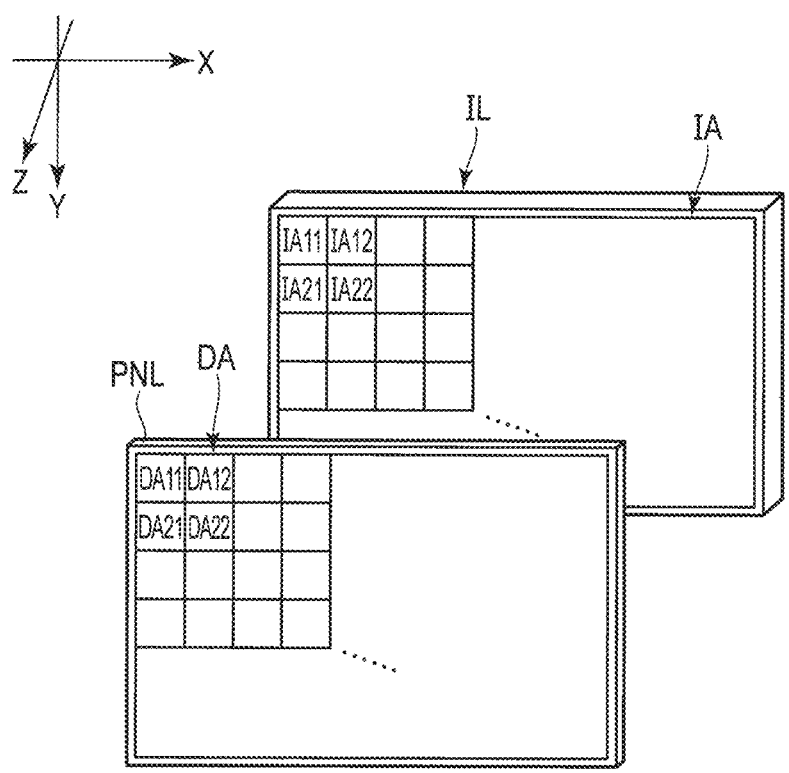
FIG. 3 is a diagram showing the correlation between an illumination area of the illumination device to which local dimming control is applied and a display area of the display panel.

FIG. 3 is a diagram showing the correspondence relationship between the illumination area IA of the illumination device IL and display area DA of the display panel PNL to which local dimming control is applied.

The illumination device IL comprises a plurality of sub-illumination areas IA11, IA12, . . . , arranged in a matrix in the illumination area IA. In the example illustrated, the sub-illumination area IA12 is adjacent to the sub illumination area IA11 along the first direction X. The sub-illumination area IA21 is adjacent to the sub-illumination area IA11 along the second direction Y. The sub-illumination area IA22 is adjacent to the sub-illumination area IA12 along the second direction Y.

The display panel PNL comprises a plurality of sub-display regions DA11, DA12, DA21 and DA22 arranged in a matrix in the display area DA. In the example illustrated, the sub-display area DA12 adjacent to the sub-display area DA11 along the first direction X. The sub-display area DA21 is adjacent to the sub-display area DA11 along the second direction Y. The sub-display area DA22 is adjacent to the sub-display area DA12 along the second direction Y.

The sub-display areas DA11, DA12, DA21 and DA22 respectively oppose the sub-illumination areas IA11, IA12, IA21 and IA22 along the third direction Z.

As explained above with reference to FIG. 7, each of the sub-illumination areas includes at least one light source. Each of the sub-display areas of the display area DA comprises m×n pixels PX. Each of the sub-display areas opposes the respective one of the sub-illumination areas and comprises m×n pixels PX. The brightness of the sub-illumination area can be controlled according to a value of current supplied to the light source. Accordingly, by changing the current values of the respective light sources of the sub-illumination areas, the brightness can be changed for each of the sub-illumination areas. The light emitted from each sub-illumination area illuminates the opposing sub-display area. Thus, in the display area DA, the brightness of those sub-illumination areas which illuminate those sub-display areas including more pixels having low gradation is set to low, whereas the brightness of those sub-illumination areas which illuminate those sub-display areas including more pixels with high gradation is set to high. In this manner, the contrast ratio of images displayed on the display area DA can be improved.

FIG. 4 is an exploded perspective view of the display device DSP of this embodiment.

The illumination device IL opposes the display panel PNL along the third direction Z. The illumination device IL comprises a plurality of light sources LS, a circuit board LFPC on which the light sources LS are mounted, a partition member PT located between the light sources LS and the display panel PNL and a light diffusion layer DP located between the partition member PT and the display panel PNL. The light sources LS are arranged in a matrix along the first direction X and the second direction Y. The light diffusion layer DP is disposed to be spaced from the partition member PT, for example.

The partition member PT comprises light guides LG which guide light emitted from the light sources LS towards the light diffusion layer DP. The light guides LG oppose the light sources LS, respectively, and are arranged in a matrix along the first direction X and the second direction Y. Each one light guide LG opposes the respective one light source LS. Here, one light source LS contains at least one light-emitting device such as a light-emitting diode (LED).

For example, a height of the light guides LG in this embodiment taken along the third direction Z is about 10 to 15 mm and an interval between the light guides LG and the light diffusion layer DP is about 1 mm.

The structure of the light guides LG will now be described by focusing on one as a typical example.

A light guide LG comprises an opening OP1 opposing a light source LS, an opening OP2 opposing the light diffusion layer DP and side surfaces P10 surrounding the light source LS. In the example illustrated, the light guide LG comprises four side surfaces P10 surrounding one light source LS. The side surfaces P10 are formed from, for example, a light-reflective material. The openings OP1 and OP2 are quadrangular, and an area of the opening OP1 is less than that of the opening OP2. Note that, for example, the area of opening OP1 is equal to or greater than an area of the light source LS, and the shape of the opening OP1 is determined as needed according to the outline of the light source LS so as to fit the light source LS in the opening OP1. The light guide LG, which has such a configuration as above, is formed into a truncated pyramid shape which spreads from the light source LS toward the light diffusion layer DP.

Note that the case where there are four side surfaces P10 to surround one light source LS is discusses here, but the embodiment is not limited to this example. Moreover, in the above-provided example, the shape of the openings OP1 and OP2 are quadrangular, but it may be some other polygonal or circular or elliptical.

Figure 5:
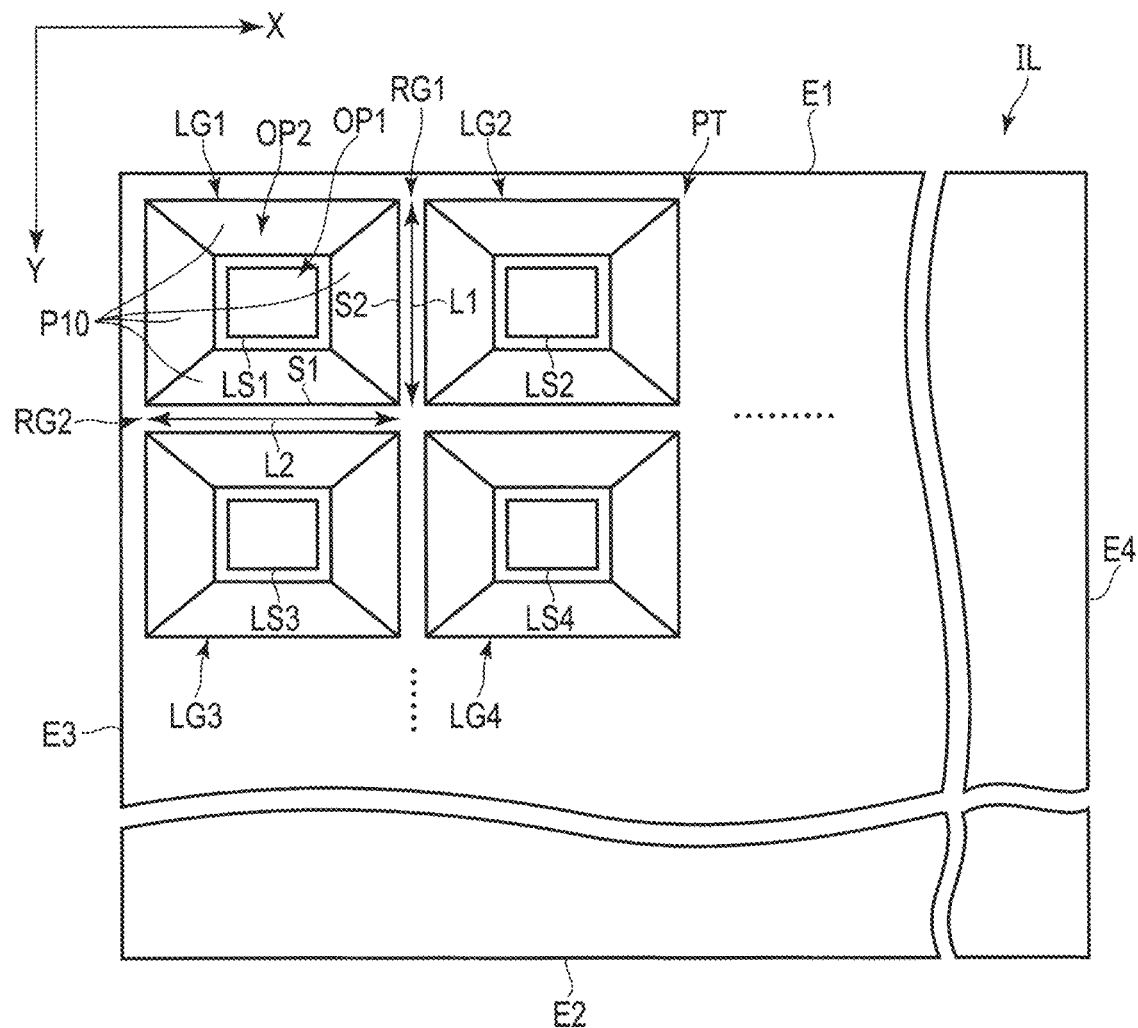
FIG. 5 is a plan view showing a configuration example of a partition member applied to the illumination device shown in FIG. 4.

FIG. 5 is a plan view showing a configuration example of the partition member PT applied to the illumination device IL shown in FIG. 4.

In the example illustrated, the illumination device IL comprises a light source LS1, a light source LS2 adjacent to the light source LS1 along the first direction X, a light source LS3 adjacent to the light source LS1 along the second direction Y, a light source LS4 adjacent to the light source LS2 along the second direction Y, a light guide LG1, a light guide LG2 adjacent to the light guide LG1 along the first direction X, a light guide LG3 adjacent to the light guide LG1 along the second direction Y and a light guide LG4 adjacent to the light guide LG2 along the second direction Y.

The light source LS1 is surrounded by the light guide LG1. The light guide LG1 and the light source LS1 form the sub-illumination area IA11 shown in FIG. 3, and they oppose the sub-display area DA11. The light source LS2 is surrounded by the light guide LG2. The light guide LG2 and the light source LS2 form the sub-illumination area IA12 shown in FIG. 3, and they oppose the sub-display area DA12. The light source LS3 is surrounded by the light guide LG3. The light guide LG3 and the light source LS3 form the sub-illumination area IA21 shown in FIG. 3, and they oppose the sub-display area DA21. The light source LS4 is surrounded by the light guide LG4. The light guide LG4 and the light source LS4 form the sub-illumination area IA22 shown in FIG. 3, and they oppose the sub-display area DA22.

The partition member PT comprises a ridge RG1 extending along the second direction Y between the light guide LG1 and the light guide LG2 and between the light guide LG3 and the light guide LG4 in plan view. Further, the partition member PT comprises a ridge RG2 extending along the first direction X between the light guide LG1 and the light guide LG3 and between the light guide LG2 and the light guide LG4 in plan view.

The ridge RG1 extends continuously from a first end E1 to a second end E2 of the partition member PT along the second direction Y, as one ridge. The ridge RG2 extends continuously from a third end E3 to a fourth end E4 of the member PT along the first direction X as one ridge. Although details will not be provided, a plurality of ridges extending along the second direction Y, which are similar to the ridge RG1 are arranged along the first direction X, and a plurality of ridges extending along the first direction X, similar to the ridge RG2 are arranged along the second direction Y. These ridges similar to ridges RG1 and RG2 cross each other to form a lattice pattern.

As to the light guide LG1 in the example illustrated, a length of a first side S1 of the opening OP2 along the first direction X is different from that of a second side S2 along the second direction Y. Here, the length of the first side S1 is greater than that of the second side S2. That is, as to the portions of the ridges RG1 and RG2, which surround the light source LS1, the portion of the ridge RG1 along the second side S2 has a length L1, and the portion of the ridge RG2 along the first side S1 has a length L2. In the example illustrated, the length L2 is greater than the length L1. Note that depending on the form of the opening OP2, the length L1 and the length L2 may be equal to each other, or the length L1 may be greater than the length L2. Moreover, the first side S1 and the second side S2 are each one side of one side surface P10, and one side surface P10 including the first side S1 and another side surface P10 including the second side S2 may differ in form. Even if the opening OP1 is rectangular, the side surfaces P10 may differ from one another depending on the length of the sides of the opening OP1 along the first direction X and the length of the sides along the second direction Y.

As described above, the light sources LS1 to LS4 correspond to the sub-display areas DA11, DA12, DA21 and DA22 shown in FIG. 3, for example. Here, the light sources LS1 to LS4 are turned on/off in synchronous with images displayed on the sub-display areas DA11, DA12, DA21 and DA22, respectively, each at brightness according to respective gradation values of the image data to drive the sub-display area DA11, DA12, DA21 and DA22.

Figure 6:
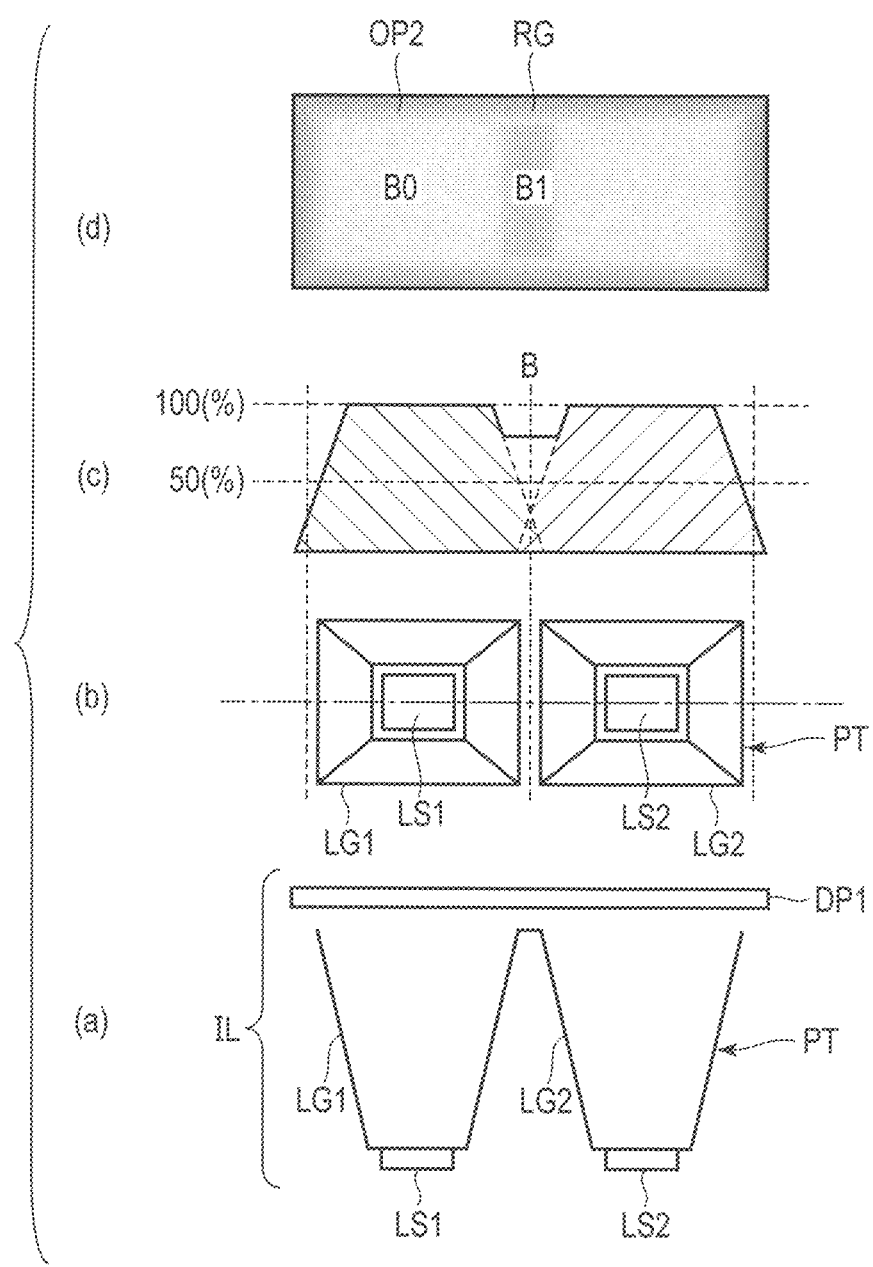
FIG. 6 is a diagram illustrating a brightness distribution when adjacent light sources in the illumination device are turned on simultaneously.

FIG. 6 is a diagram illustrating the brightness distribution when adjacent light sources in the illumination device IL are turned on simultaneously. FIG. 6, part (a), is a schematic cross section including the light sources LS1 and LS2, the partition member PT and the light diffusion layer DP1. FIG. 6, part (b), is a schematic plan view including the light sources LS1 and LS2 and the partition member PT. FIG. 6, part (c) is a diagram schematically showing the brightness distribution of light having passed the light diffusion layer DP1 when the light sources LS1 and LS2 are turned on simultaneously. FIG. 6, part (d), is a plan view showing an image of brightness B0 in the opening OP2 and brightness B1 in the ridge RG when the light sources LS1 and LS2 are turned on simultaneously. Note that FIG. 6 shows the brightness distribution when the light diffusion layer DP1 is used, and the light diffusion layer DP1 has, for example, such isotropic diffusibility as described later.

The brightness distribution when only the light source LS1 is turned on is indicated by downward-sloping hatch lines in the figure, in which the brightness becomes substantially uniform near the central portion which includes the location immediately above the light source LS1, and the brightness decreases gently as it approaches near a boundary B of the light source LS2. In the example illustrated, when the brightness near the central portion is set to 100%, the brightness near the boundary B is lower than 50%. The brightness distribution when only the light source LS2 is turned on is indicated by upward-sloping hatch lines, and the brightness near the boundary B is lower than 50% as in the case of the light source LS1 only. The brightness distribution when the light sources LS1 and LS2 are turned on simultaneously is indicated in the section encircled by a solid line, and a brightness of lower than 100% is obtained in the boundary B. That is, when the light sources LS1 and LS2 are turned on simultaneously, a low-brightness dark line appears in the boundary B rather than near the location directly above the light sources LS1 and LS2. In the example shown in FIG. 6, part (d), the brightness B1 is lower than the brightness B0.

Note that the brightness distribution indicted by the solid line in FIG. 6 (c) is linear near the boundary B, but it is not limited to this. It may exhibit various distributions including a curvy line.

Here, the relationship between the light sources LS1 and LS2 adjacent to each other along the first direction X is described, and with reference to the example shown in FIG. 5, the location near the boundary B between the light sources LS1 and LS2 corresponds to the ridge RG1. In other words, the example shown in FIG. 6 corresponds to a mode in which a dark line appears near the ridge RG1.

Moreover, a similar phenomenon may occur in the relationship between the light sources LS1 and LS3 adjacent to each other along the second direction Y. In this case, with reference to the example shown in FIG. 5, the light sources LS1 and LS2 of FIG. 6 are replaced by the light sources LS1 and LS3 of FIG. 5. Here, the dark line in the boundary B shown in FIG. 6 corresponds to a mode in which a dark line appears near the ridge RG2.

Figure 7:
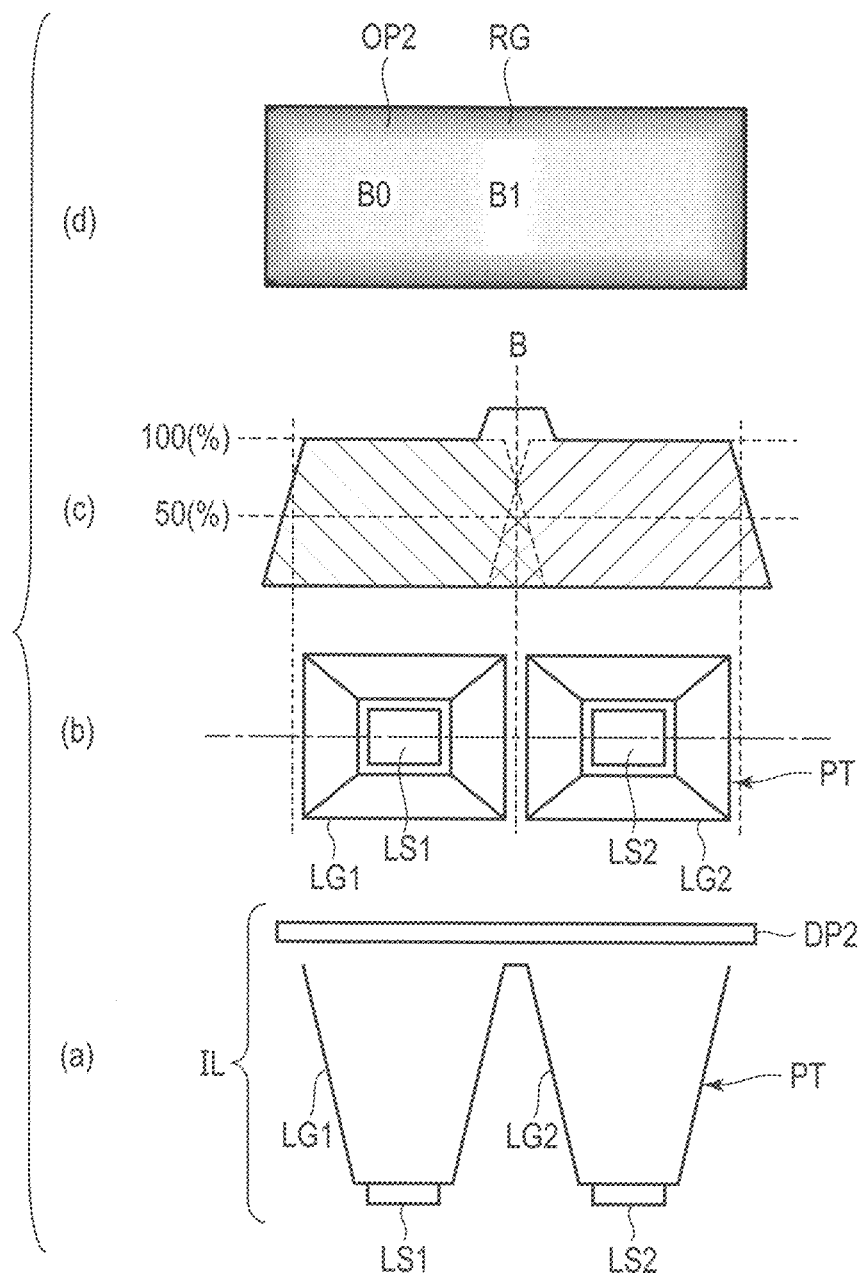
FIG. 7 is a diagram illustrating a brightness distribution when adjacent light sources in the illumination device are turned on simultaneously.

FIG. 7 is a diagram illustrating another brightness distribution when light sources adjacent to each other in the illumination device IL are turned on simultaneously. As compared to the configuration shown in FIG. 6, the brightness distribution shown in FIG. 7, part (c), differs from the brightness distribution shown in FIG. 6, part (c). Note that FIG. 7 shows the brightness distribution when the light diffusion layer DP2 is employed, and the light diffusion layer DP2 has, for example, such isotropic diffusibility that will be described later.

The brightness distribution when only the light source LS1 is turned on is indicated by downward-sloping hatch lines in the figure, in which the brightness becomes substantially uniform near the central portion which includes the location immediately above the light source LS1, and the brightness decreases gently as it approaches near a boundary B of the light source LS2. In the example illustrated, when the brightness near the central portion is set to 100%, the brightness near the boundary B is higher than 50%. The brightness distribution when only the light source LS2 is turned on is indicated by upward-sloping hatch lines, and the brightness near the boundary B is higher than 50% as in the case of the light source LS1 only. The brightness distribution when the light sources LS1 and LS2 are turned on simultaneously is indicated in the section encircled by a solid line, and a brightness of higher than 100% is obtained in the boundary B. That is, when the light sources LS1 and LS2 are turned on simultaneously, a high-brightness bright line appears in the boundary B rather than near the location directly above the light sources LS1 and LS2. In the example shown in FIG. 7, part (d), the brightness B1 is higher than the brightness B0.

Note that the brightness distribution indicted by the solid line in FIG. 7, part (c) is linear near the boundary B, but it is not limited to this. It may exhibit various distributions including a curvy line.

With reference to FIG. 5, the example shown in FIG. 7 corresponds to a mode in which a bright line appears near the ridge RG1 between the light sources LS1 and LS2 adjacent to each other along the first direction X. Moreover, a similar phenomenon may occur in the relationship between the light sources LS1 and LS3 adjacent to each other along the second direction Y, and with reference to the example shown in FIG. 5, it corresponds to a mode in which a bright line appears near the ridge RG2.

The brightness distribution of each light source LS varies with conditions such an emission angle of light emitted from light source LS, a position and a height of each light guide LG and an aspect ratio in the X-Y plane. Further, in the light source array in which a plurality of light sources LS are arranged in order, the brightness near the boundary of each adjacent pair of light sources LS varies with conditions such as an interval between adjacent light sources LS and an interval between adjacent light guides LG in addition to the brightness distribution of each light source. For this reason, the designing of the illumination device IL is subjected to various restrictions in order to acquire uniform brightness distribution of the illumination device IL in the X-Y plane or to acquire a brightness near the boundary B, which is equivalent to that near the location directly above each light source.

For example, in the illumination device IL shown in FIG. 5, a dark or bright line may appear directly above both of the ridges RG1 and RG2, or a dark line may appear directly above one of the ridges RG1 and RG2, whereas a bright line may appear directly above the other one. This embodiment can adapt configuration examples to be described below so as to suppress such non-uniformity in brightness.

Figure 8:
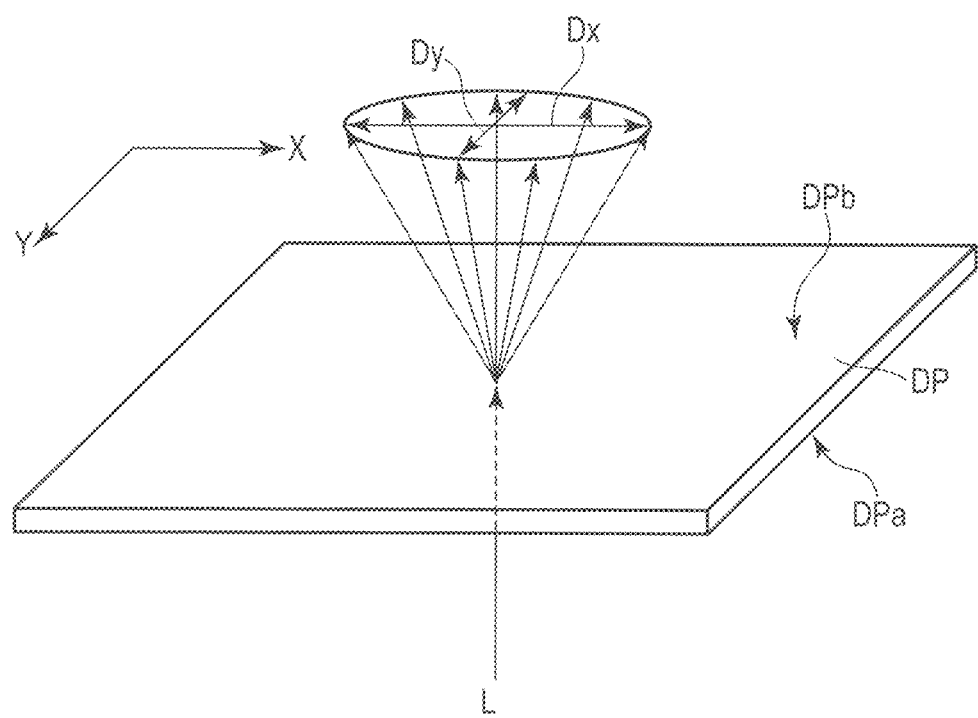
FIG. 8 is a diagram showing a structure of a light diffusion layer of this embodiment.

FIG. 8 is a diagram showing a structure of the light diffusion layer DP of this embodiment.

The light diffusion layer DP has a first diffusion degree Dx in the first direction X and a second diffusion degree Dy in the second direction Y. In this embodiment, the first diffusion degree Dx is different from the second diffusion degree Dy. In the example illustrated, the first diffusion degree Dx is greater than the second diffusion degree Dy. That is, in the light diffusion layer DP, light L entering one surface DPa is diffused when emitted from the other surface DPb more greatly in the first direction X than in the second direction Y by the light diffusion layer DP. Thus, the light diffusion layer DP applied in this embodiment has anisotropic light diffusibility.

On the other hand, when the first diffusion degree Dx and the second diffusion degree Dy are equal to each other, light L entering one surface DPa is diffused when emitted from the other surface DPb equally in the first direction X and the second direction Y by the light diffusion layer DP. The light diffusion layer DP with such configuration has isotropic light diffusibility, and the light diffusion layer DP1 shown in FIG. 6 and the light diffusion layer DP2 shown in FIG. 7 correspond to this.

Figure 9:
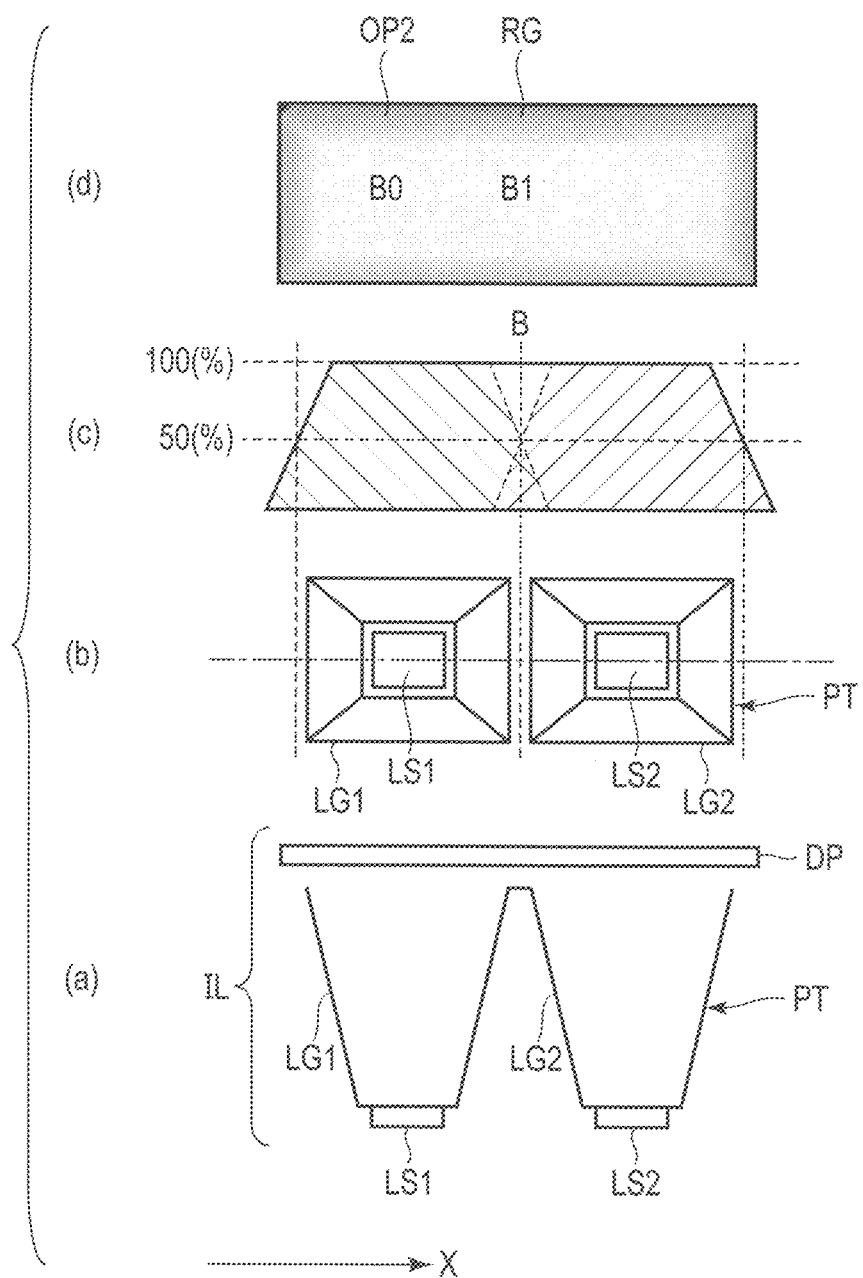
FIG. 9 is a diagram illustrating a brightness distribution when adjacent light sources in the illumination device are turned on simultaneously.

FIG. 9 is a diagram illustrating the brightness distribution when light sources adjacent to each other in the illumination device IL are turned on simultaneously. As compared to the configurations shown in FIGS. 6 and 7, the brightness distribution shown in FIG. 9, part (c), differs from the brightness distribution shown in FIG. 6 or 7, part (c). That is, the light diffusion layer DP shown in FIG. 9 has an anisotropic diffusibility as shown in FIG. 8.

The brightness distribution when only the light source LS1 is turned on is indicated by downward-sloping hatch lines in the figure. That is, in the light diffusion layer DP, since the first diffusion degree Dx is greater than the second diffusion degree Dy, light emitted from the light source LS1 diffuses more in the first direction X. Therefore, as illustrated, as compared to the brightness distribution shown in FIG. 6, the brightness near the boundary B increases to reach about 50%. The brightness distribution when only the light source LS2 is turned on is similar to the case of the light source LS1, and is indicated by upward-sloping hatch lines in the figure, in which the brightness near the boundary B is 50%. Thus, the brightness distribution when the light sources LS1 and LS2 are turned on simultaneously is as indicated by the section encircled by a solid line in the figure. That is, substantially 100% of brightness is acquired not only in the section near directly above each of the light sources LS1 and LS2 but also on the boundary B, thereby making it possible to equalize the brightness distribution. In the example shown in FIG. 9, part (d), the brightness B1 is equal to the brightness B0.

With reference to the example shown in FIG. 5, for the mode in which a dark line appears near the ridge RG1 between the light sources LS1 and LS2, the dark line of the ridge RG1 can be suppressed by applying the light diffusion layer DP described in this embodiment.

Similarly, for the mode in which a dark line appears near the ridge RG2 between the light sources LS1 and LS3 adjacent along the second direction Y, the dark line of the ridge RG2 can be suppressed by applying a light diffusion layer DP having such anisotropic diffusibility that the second diffusion degree Dy is greater than the first diffusion degree Dx.

On the other hand, when the light diffusion layer DP of this embodiment is applied, the brightness near the boundary B can be reduced as compared to the brightness distribution shown in FIG. 7. This is because the concentration of the light to near the boundary B is alleviate to diffuse the light in the first direction X. For this reason, for also the mode in which a bright line appears, the bright line can be suppressed by applying the light diffusion layer DP described in this embodiment.

According to this embodiment, the light diffusion layer DP has the first diffusion degree Dx in the first direction X and the second diffusion degree Dy in the second direction Y, and the first diffusion degree Dx differs from the second diffusion degree Dy. For example, the first diffusion degree Dx is greater than the second diffusion degree Dy. That is, the first diffusion degree Dx in the first direction X which crosses the second direction Y along which the ridge RG1 extends is greater than the second diffusion degree Dy in the second direction Y along which the ridge RG1 extends. Therefore, the light emitted from each of the light sources LS1 and LS2 spreads in the first direction X. Thus, the brightness of the ridge RG1 corresponding to the section near the boundary B can be brought close to the brightness of the sections directly above the light sources LS1 and LS2. That is, for the mode in which a dark line appears directly above the ridge RG1, light is guided to directly above the ridge RG1 by the light diffusion layer DP, thereby making it possible to suppress the creation of dark line directly above the ridge RG1. For the mode in which a bright line appears directly above the ridge RG1, the light is diffused from directly above the ridge RG1 by the light diffusion layer DP, thereby making it possible to suppress the creation of bright line directly above the ridge RG1.

As described above, according to the illumination device IL of this embodiment, the occurrence of non-uniformity in brightness can be suppressed. In addition, according to the display device DSP to which the illumination device IL of this embodiment is applied, degradation of the display quality resulting from the non-uniformity in brightness of the illumination device IL can be suppressed.

Figure 11B:
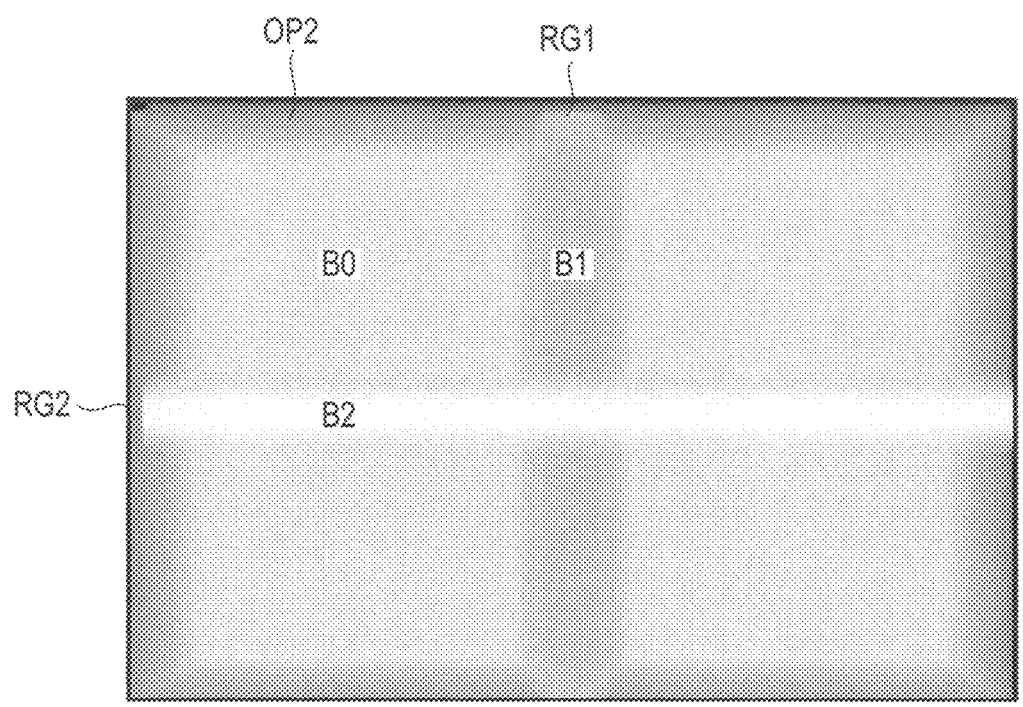
FIG. 11B is a diagram an image of a sample 1 shown in FIG. 11A.

FIG. 10 is a diagram illustrating the relationship between the brightness B0 in the opening OP2, the brightness B1 in the ridge RG1 and the brightness B2 in the ridge RG2. Further, FIG. 11A is a table indicating the relationship between the comparison in brightnesses B0, B1 and B2, and the diffusion degree of the light diffusion layer DP adapted in samples. FIG. 11B shows an image of Sample 1 shown in FIG. 11A.

In the example shown in FIG. 10, the first width W1 of the ridge RG1 along the first direction X is greater than the second width W2 of the ridge RG2 along the second direction Y. Here, the brightnesses B0, B1 and B2 are different from each other.

Here, the brightness/darkness in the brightnesses B1 and B2 shown in FIG. 11A will be described. The brightness B1 being dark corresponds to the case where the brightness B1 is lower than the brightness B0 (B1<B0). The brightness B1 being bright corresponds to the case where the brightness B1 is higher than the brightness B0 (B1>B0). Further, the brightness B2 being dark corresponds to the case where the brightness B2 is lower than the brightness B0 (B2<B0), which includes the case where the brightness B2 is lower than the brightness B1 (B2<B1<B0) and also the case where the brightness B2 is higher than the brightness B1 (B1<B2<B0). The brightness B2 being bright corresponds to the case where the brightness B2 is higher than the brightness B0 (B2>B0), which includes the case where the brightness B2 is lower than the brightness B1 (B0<B2<B1) and the case where the brightness B2 is higher than the brightness B1 (B0<B1<B2). Note that the brightness/darkness of the brightnesses B1 and B2 of FIG. 11A is based on the brightness before the light diffusion layer DP of this embodiment is applied.

In the light diffusion layer DP, when the diffusion degree Dx in the first direction X along which the ridge RG1 extends is greater than the diffusion degree Dy in the second direction Y crossing the first direction X, along which the ridge RG1 extends, the occurrence of a bright or dark line directly above the ridge RG1 can be suppressed. Further, in the light diffusion layer DP, when the diffusion degree Dy in the second direction Y crossing the first direction X, along which the ridge RG2 extends is greater than the diffusion degree Dx in the first direction X, along which the ridge RG2 extends, the occurrence of a bright or dark line directly above the ridge RG2 can be suppressed.

The sample 1 shows the case where the brightness B1 is dark and the brightness B2 is bright. In this case, a light diffusion layer DP having a diffusion degree Dx in the first direction X, which is higher than the diffusion degree Dy in the second direction Y is used in order to suppress the occurrence of a dark line directly above the ridge RG1. As a result of adapting the light diffusion layer DP, the difference between the brightness B1 in the first ridge RG1 and the brightness B0 in the opening OP2 becomes less than the difference between the brightness B2 in the second ridge RG2 and the brightness B0 in the opening OP2 in plan view, and therefore the dark line of the ridge RG1 is mitigated. Before and after applying the light diffusion layer DP, the brightness B2 in the ridge RG2 is higher than the brightness B0 in the opening OP2. In the sample 1, as shown in FIG. 11B, before the light diffusion layer DP is applied, the brightness B1 is dark and the brightness B2 is bright.

The sample 2 shows the case where the brightness B1 is bright and the brightness B2 is dark. In this case, a light diffusion layer DP having a diffusion degree Dy in the second direction Y, which is greater than the diffusion degree Dx in the first direction X is used in order to suppress the occurrence of the dark line directly above the ridge RG2. As a result of applying the light diffusion layer DP, the dark line of the ridge RG2 is mitigated.

The sample 3 shows the case where the brightnesses B1 and B2 are both bright. Here, the brightness B1 is higher than the brightness B2 (B0<B2<B1). In this case, a light diffusion layer DP having a diffusion degree Dx in the first direction X, which is greater than the diffusion degree Dy of the second direction Y is used in order to compare the bright line directly above the ridge RG1 and the bright line directly above the ridge RG2 and suppress the occurrence of a brighter line directly above the ridge RG1. As a result of applying the light diffusion layer DP, the bright line of the ridge RG1 is mitigated.

The sample 4 shows the case where the brightnesses B1 and B2 are both bright. Here, the brightness B2 is higher than the brightness B1 (B0<B1<B2). In this case, a light diffusion layer DP having a diffusion degree Dy in the second direction Y, which is greater than the diffusion degree Dx in the first direction X is used in order to compare the bright line directly above the ridge RG1 and the bright line directly above the ridge RG2 with each other and suppress the occurrence of a bright line having a higher brightness directly above the ridge RG2. As a result of applying the light diffusion layer DP, the bright line of the ridge RG2 is mitigated.

The sample 5 shows the case where the brightnesses B1 and B2 are both dark. Here, the brightness B2 is lower than the brightness B1 (B2<B1<B0). In this case, a light diffusion layer DP having a diffusion degree Dy in the second direction Y, which is greater than the diffusion degree Dx in the first direction X is used in order to compare the dark line directly above the ridge RG1 and the dark line directly above the ridge RG2 with each other and suppress the occurrence of a dark line having a lower brightness directly above the ridge RG2. As a result of applying the light diffusion layer DP, the dark line of the ridge RG2 is mitigated.

The sample 6 shows the case where the brightnesses B1 and B2 are both dark. Here, the brightness B1 is lower than the brightness B2 (B1<B2<B0). In this case, a light diffusion layer DP having a diffusion degree Dx in the first direction X, which is greater than the diffusion degree Dy in the second direction Y is used in order to compare the dark line directly above the ridge RG1 the dark line directly above the ridge RG2 with each other and suppress the occurrence of a dark line having a lower brightness directly above the ridge RG1. As a result of applying the light diffusion layer DP, the bright line of the ridge RG1 is mitigated.

As presented by the samples 1 to 6, when a bright line appears directly above one of the ridges RG1 and RG2 and a dark line appears in the other, the occurrence of the dark line can be suppressed by providing the light diffusion layer DP of this embodiment. When a bright line appears directly above both of the ridge RG1 and RG2, the occurrence of a brighter line can be suppressed by providing the light diffusion layer DP. When a dark line appears directly above both of the ridge RG1 and RG2, the occurrence of a dark line having a low brightness can be suppressed by providing the light diffusion layer DP. FIG. 11B shows only the sample 1, and similarly, the samples 2 to 6 exhibit images corresponding to the brightnesses B1 and B2.

Moreover, as mentioned above, when a bright or dark line of the ridge RG1 is suppressed by the light diffusion layer DP, the occurrence of a bright or dark line of the ridge RG2 can be suppressed by, for example, controlling the transmissivity of the display panel PNL by the controller 10 shown in FIG. 1. More specifically, the controller 10 computes the brightness profile of the display device DSP and controls the transmissivity of the display panel PNL. The controller 10 corrects the transmissivity at the position overlapping the second ridge RG2 based on the computed brightness profile. Similarly, when a bright or dark line of the ridge RG2 is suppressed by the light diffusion layer DP, the occurrence of a bright or dark line of the ridge RG1 can be suppressed by, for example, controlling the transmissivity of the display panel PNL by the controller 10 shown in FIG. 1. The controller 10 computes the brightness profile of the display device DSP, and corrects the transmissivity at the position overlapping the ridge RG1. Note that the controller 10 may compute the brightness profile of the illumination device IL and control the transmissivity of the display panel PNL.

As described above, it suffices if the controller 10 corrects the transmissivity of the display panel PNL for only one of the ridges RG1 and RG2, and thus the process can be simplified as compared to the case where the transmissivity must be corrected for both of the ridges RG1 and RG2. Moreover, the increase in scale of the circuits in the controller 10 can be suppressed.

Figure 12:
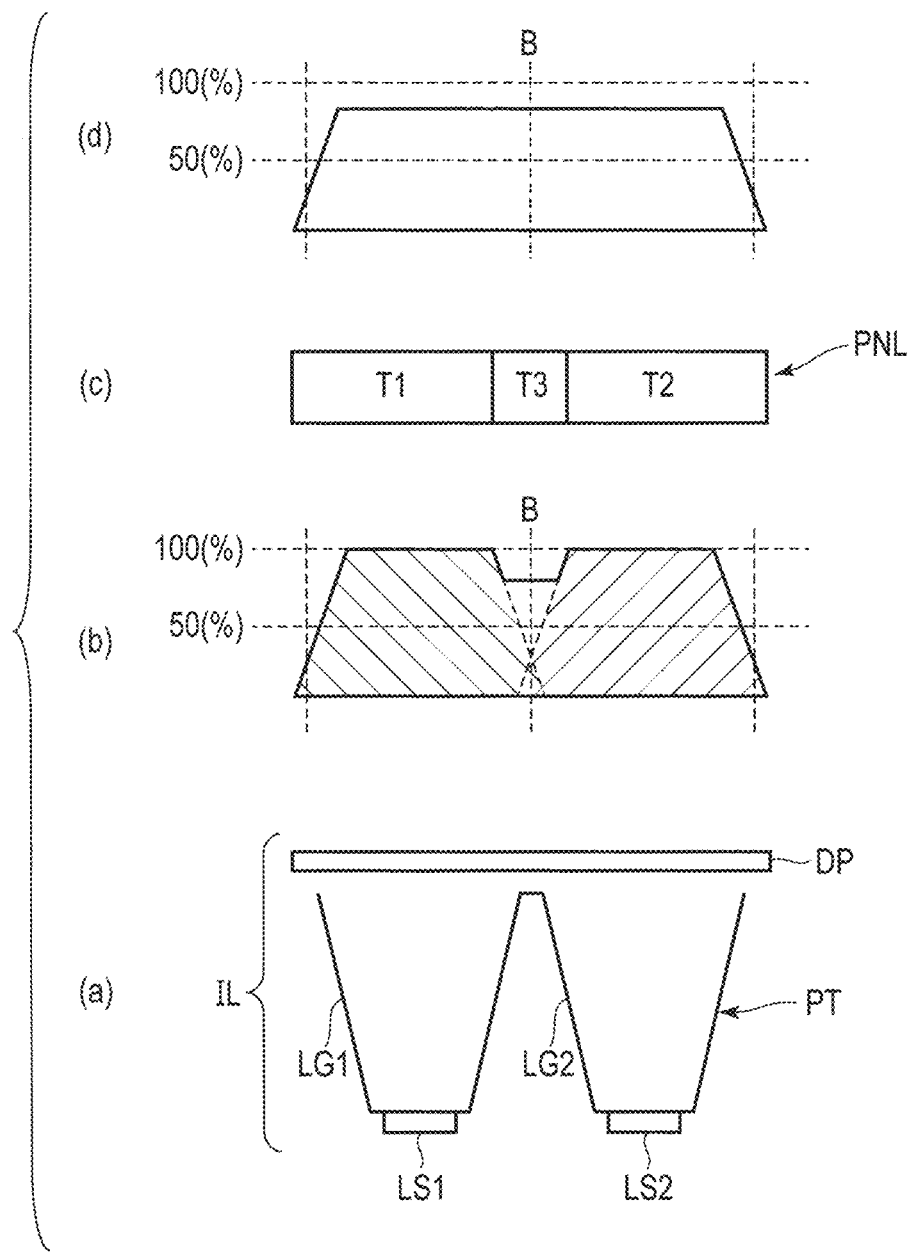
FIG. 12 is a diagram illustrating a brightness distribution of light transmitted through the display panel PNL when adjacent light sources in the illumination device are turned on simultaneously.

FIG. 12 is a diagram illustrating the brightness distribution of the light transmitted through the display panel PNL when the light sources adjacent to each other in the illumination device IL are turned on simultaneously. That is, in the ridge RG1 or ridge RG2, when one of the bright and dark lines is suppressed by the light diffusion layer DP as described above, the occurrence of a dark line in the other ridge can be suppressed by controlling the transmissivity of the display panel PNL. Such a method will be described.

FIG. 12, part (a), is a schematic cross section including those of the light sources LS1 and LS2, the partition member PT and the light diffusion layer DP1. FIG. 12, part (b) is a diagram schematically showing the brightness distribution of the light transmitted through the diffusion layer DP1 when the light sources LS1 and LS2 are turned on simultaneously. FIG. 12, part (c), is a diagram schematically showing a distribution in transmissivity of the display panel PNL. FIG. 12, part (d), is a diagram schematically showing the brightness distribution of the light transmitted through the display panel PNL when the light sources LS1 and LS2 are turned on simultaneously.

The brightness distribution when the light sources LS1 and LS2 are turned on simultaneously is as indicated by the section encircled by the solid line in FIG. 12, part (b), and in the boundary B, a brightness lower than 100% is obtained. That is, when the light sources LS1 and LS2 are turned on simultaneously, a low-intensity dark line appears the boundary B.

Here, the display panel PNL shown in FIG. 12, part (c), has a transmissivity T1 directly above the light source LS1, a directly above and light the source LS2 transmissivity T2 and a transmissivity T3 near the boundary B. The transmissivities T1 and T2 are equal to each other. Further, the transmissivities T1 and T2 are lower than the transmissivity T3. That is, the transmissivities T1 and T2 are reduced by reducing the gradation of display according to the brightness profile of the backlight unit BL. Thus, of the light transmitted through the light diffusion layer DP, the brightness of the light near the section directly above the light source LS1 and the brightness near the section directly above the light source LS2 are transmitted through the display panel PNL, thereby reducing the brightness. In this manner, as to the light transmitted through the display panel PNL, the brightness near the section directly above the light source LS1 and that near the section directly above the light source LS2 becomes substantially equal to the brightness near the boundary B. Therefore, the occurrence of the dark line near the boundary B can be suppressed, thereby making it possible to equalize the distribution of the brightness of the display device.

Figure 13:
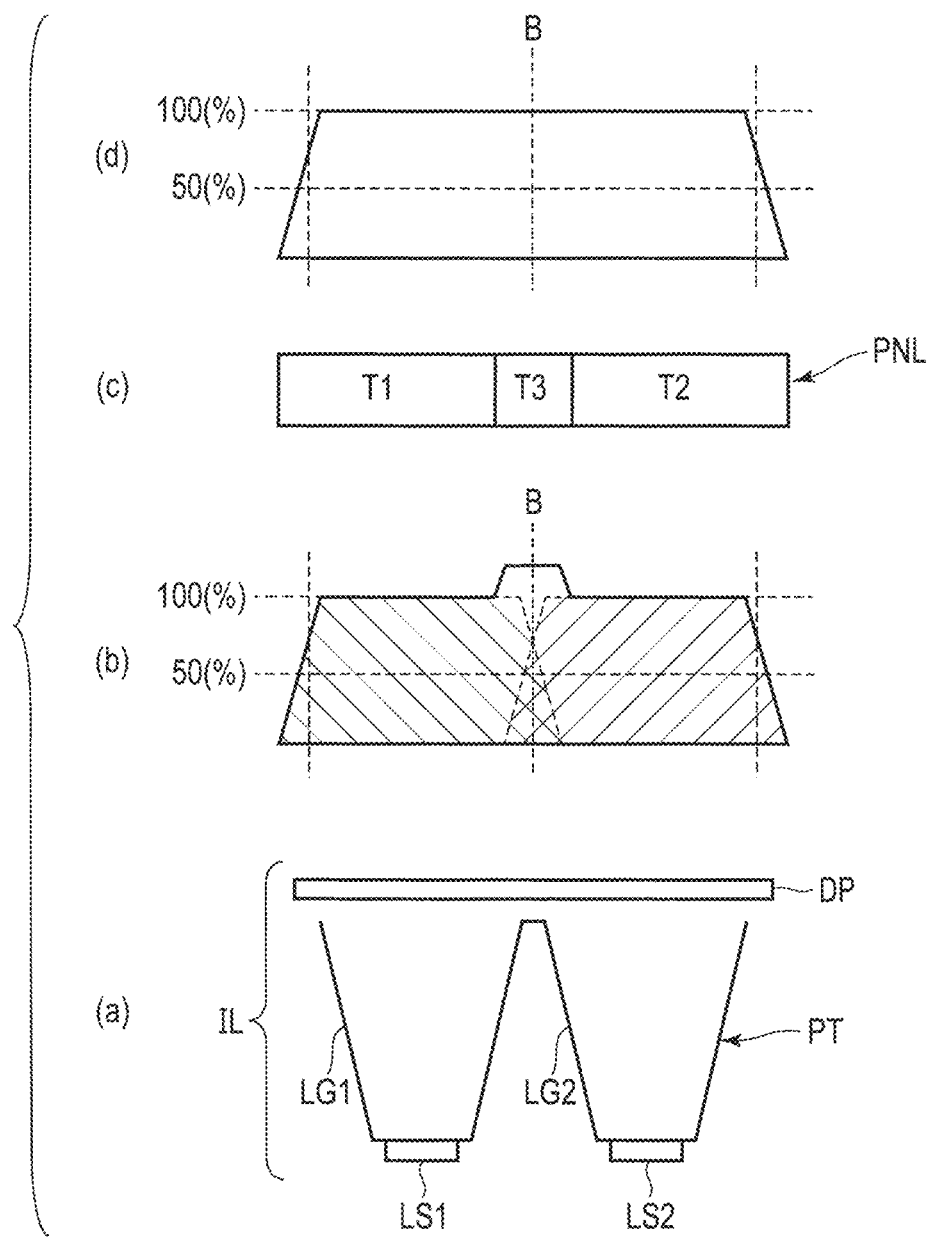
FIG. 13 is a diagram illustrating a brightness distribution of light transmitted through the display panel PNL when adjacent light sources in the illumination device are turned on simultaneously.

FIG. 13 is a diagram illustrating the brightness distribution of the light transmitted through the display panel PNL when the light sources adjacent to each other in the illumination device IL are turned on simultaneously. That is, in the ridge RG1 or ridge RG2, when one of the bright and dark lines is suppressed by the light diffusion layer DP as described above, the occurrence of a bright line in the other ridge can be suppressed by controlling the transmissivity of the display panel PNL. Such a method will be described.

FIG. 13 is different from FIG. 12 in the configuration of the brightness distribution shown in FIG. 13, part (b) as compared to that shown in FIG. 12, part (b). Further, the brightness distribution shown in FIG. 13, part (d) differs from that shown in FIG. 12, part (d).

The brightness distribution when the light sources LS1 and LS2 are turned on simultaneously is as indicated by the section encircled by the solid line in FIG. 13, part (b), and in the boundary B, a brightness higher than 100% is obtained. That is, when the light sources LS1 and LS2 are turned on simultaneously, a high-intensity bright line appears the boundary B.

Here, the transmissivities T1 and T2 of the display panel PNL shown in FIG. 13, part (c) are equal to each other, and the transmissivity T3 is lower than the transmissivity T1 and T2. Thus, of the light transmitted through the light diffusion layer DP, the brightness of the light near the boundary B becomes substantially equal to the brightness of the light near the section directly above the light source LS1 and that near the section directly above the light source LS2. Thus, the occurrence of the bright line near the boundary B can be suppressed, thereby making it possible to equalize the distribution of the brightness of the display device. Here, when a bright line appears directly above one of the ridges RG1 and RG2 and a dark line appears above the other, the occurrence of the dark line is suppressed by providing the light diffusion layer DP and that of the bright line is suppressed by controlling the transmissivity of the display panel PNL. Further, when bright lines appear directly above both of the ridges RG1 and RG2, by arranging light diffusion layer DP, the occurrence of a bright line above one of the ridges RG1 or RG2 is suppressed by providing the light diffusion layer DP and the occurrence of a bright line above the other of the ridges RG1 or RG2 is suppressed by controlling the transmissivity of the display panel PNL. When dark lines appear directly above both of the ridge RG1 and RG2, the occurrence of a dark line with a lower brightness is suppressed by providing the light diffusion layer DP and the occurrence of a dark line with a higher brightness is suppressed by controlling the transmissivity of the display panel PNL.

Figure 14:
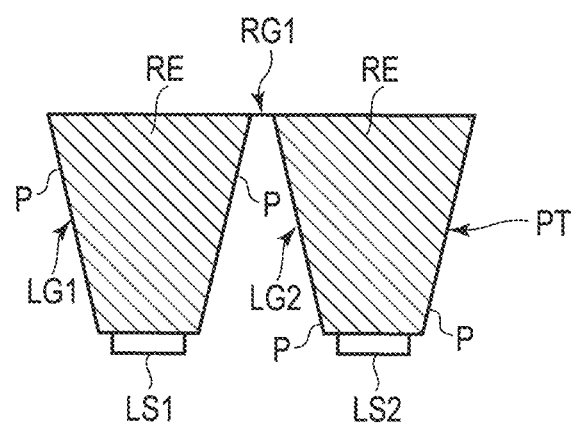
FIG. 14 is a diagram showing another example of the partition member of this embodiment.

FIG. 14 is a diagram showing another example of the partition member PT of this embodiment. The partition member PT shown in FIG. 14 is different from that shown in FIG. 9 in that an inside defined by side surfaces P of each of the light guides LG1 and LG2 is filled with a resin RE.

In the example illustrated, the light guides LG1 and LG2 are connected to each other by the ridge RG1, but they may be disposed each as a single body. Moreover, the side surfaces P may not need to surround the resin RE and the surface of the resin RE may be coated with a reflective material in that case.

Figure 15:
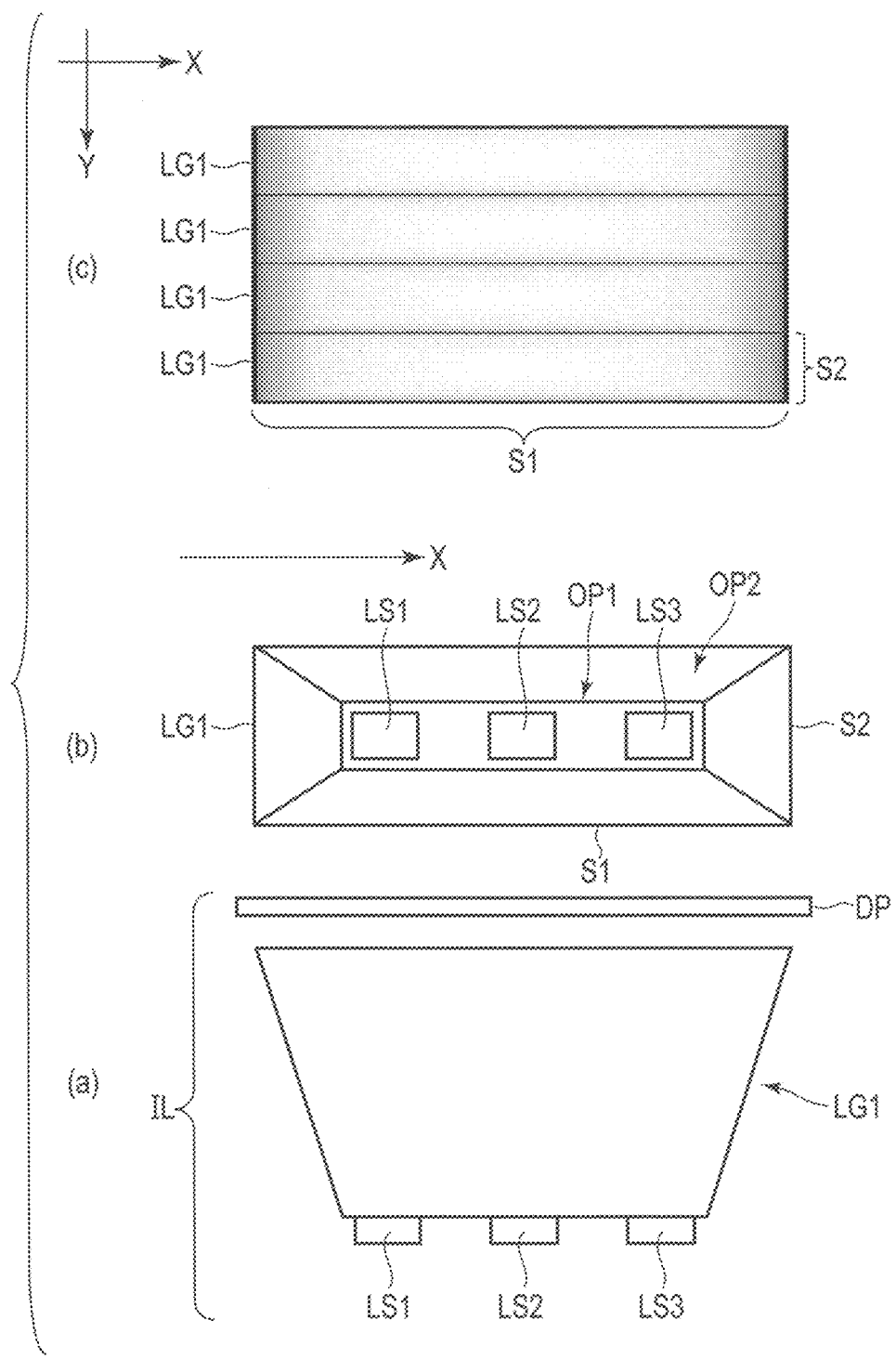
FIG. 15 is a diagram showing another example of the light guide of this embodiment.

FIG. 15 is a diagram showing another example of the light guide LG1 of this embodiment.

FIG. 15 is different from FIG. 9 in the structure that a single light guide LG1 surrounds three light sources LS1 to LS3. FIG. 15, part (a) is a schematic cross section including those of the light source LS1, LS2 and LS3, the light guide LG1 and the light diffusion layer DP. FIG. 15, part (b), is a schematic plan view including those of the light source LS1, LS2 and LS3, the light guide LG1. FIG. 15, part (c), is a plan view showing an image of a plurality of light guides LG in terms of brightness when the light sources LS1, LS2 and LS3 are turned on simultaneously.

The length of the first side S1 of The opening OP2 is greater than the length of the second side S2. The light sources LS1 to LS3 are disposed in the opening OP1 in plan view. The light sources LS1 to LS3 are arranged along the first direction X. Here, the light guide LG1 and the light sources LS1 to LS3 oppose the sub-display area DA11 shown in FIG. 3.

At this time, the light diffusion layer DP suppresses the occurrence of a bright line or a dark line in ridgelines along the direction of the first side S1. That is, the light diffusion layer DP exhibits a degree of diffusion higher in the direction along the second side S2 than that in the direction along the first side S1. Moreover, the light diffusion layer DP, with such a degree of diffusion along the first side, can suppress the occurrence of non-uniformity in brightness along the second side S2 respectively between the light sources LS1, L2 and LS3.

In the example shown in FIG. 15, part (c), a plurality of light guides LG are arranged along the second direction Y. Each single light guide LG surrounds three light sources arranged along the first direction X as in the case of the light guide LG1. In the example illustrated, the brightness before the light diffusion layer DP of this embodiment is applied is shown, and dark lines appear along the first side S1 between each adjacent pair of light guides LG Here, in order to suppress the occurrence of the dark lines along the first side, a light diffusion layer DP exhibiting a higher degree of diffusion in the direction along the second side S2 than that of the direction along the first side S1 is used.

The example illustrated is directed to the structure that one light guide surrounds three light sources arranged along the first direction X, but the example is not limited to this. For example, one light guide may surround two or three or more light sources, or may surround a plurality of light sources arranged along the second direction Y. Moreover, one light guide may surround light sources arranged in a plurality of rows and columns.

Figure 16:
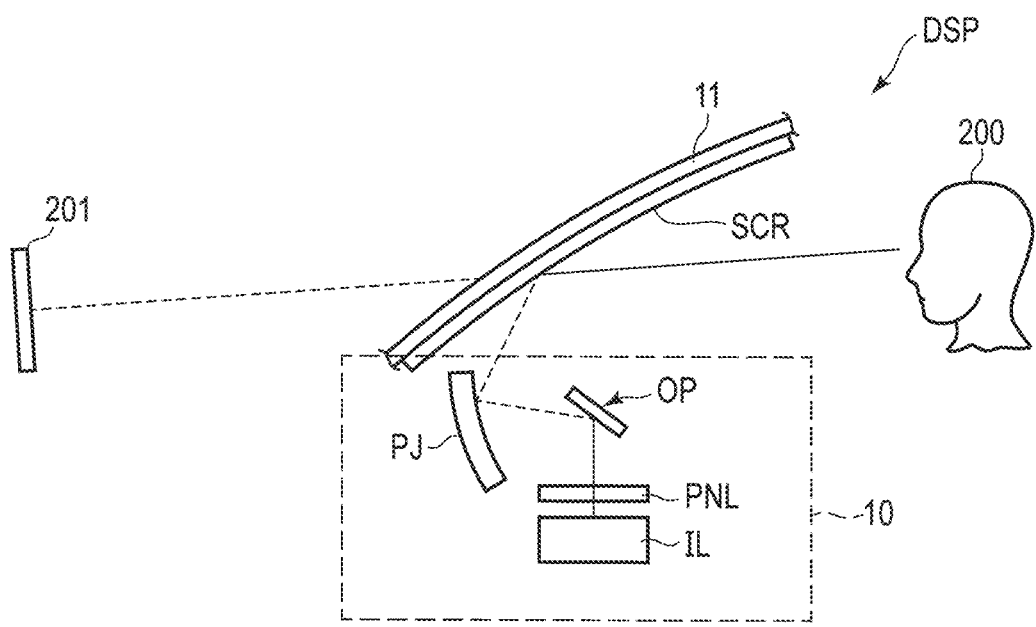
FIG. 16 is a diagram showing an example in which the display device of this embodiment is applied.

FIG. 16 is a diagram showing an example of application of the display device DSP in this embodiment. The display device DSP in the illustrated application example is a head-up display which employs a front window such as of a vehicle, as a projection surface (screen) SCR for image projection. Note that the projection screen SCR is not limited to the front window itself, but other combiners may be used.

The display device DSP comprises an illumination device IL, a display panel PNL, an optical system OP, and a projector PJ.

As described above, the illumination device IL comprises a plurality of light sources arranged on a rear surface of the display panel PNL to illuminate the display panel PNL. The details of the illumination device IL and the display panel PNL are already described above, and therefore the explanations therefor will be omitted.

The optical system OP comprises one or more mirrors which guide the light (display light) emitted from the display panel PNL to the projector PJ. The projector PJ projects the light guided by the optical system OP onto the projection screen SCR. To such a projector PJ, a concave mirror, for example, can be applied.

The controller 10, as described above, drives the display panel PNL based on image data and displays the image on the display area DA, and also judges necessary brightness for each sub-illumination area to light the light sources of the corresponding sub-illumination area at a predetermined brightness. Thus, a user 200 who uses the display device DSP can view a virtual image 201 in front of the projection screen SCR.

As described above, according to this embodiment, a display device which can suppress the degradation in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a display panel; and
   an illumination device opposed to the display panel so as to illuminates the display panel,
   the illumination device comprising:
   a first light guide,
   a second light guide arranged adjacent to the first light guide in a first direction,
   a third light guide arranged adjacent to the first light guide in a second direction intersecting the first direction, and
   a fourth light guide arranged adjacent to the second light guide in the second direction,
   a light diffusion layer disposed between the display panel and each of the first light guide, the second light guide, the third light guide, and the fourth light guide, wherein
   the light diffusion layer exhibit a first diffusion degree in the first direction and a second diffusion degree in the second direction,
   the second diffusion degree is different from the first diffusion degree,
   the illumination device comprises a first ridge between the first light guide and the second light guide and a second ridge between the first light guide and the third light guide, and
   under the light diffusion layer, a first brightness in the first ridge is different from a second brightness in the second ridge.

2. The display device of claim 1, wherein
   the first brightness is lower than the second brightness, and
   the first diffusion degree is higher than the second diffusion degree.

3. The display device of claim 2, wherein
   the first brightness is lower than a reference brightness, and
   the second brightness is higher than the reference brightness.

4. The display device of claim 1, wherein
   the first brightness is higher than the second brightness, and
   the first diffusion degree is lower than the second diffusion degree.

5. The display device of claim 4, wherein,
   the first brightness is higher than a reference brightness, and
   the second brightness is lower than the reference brightness.

6. The display device of claim 1, wherein
   the first brightness is higher than the second brightness,
   the second brightness is higher than a reference brightness, and
   the first diffusion degree is higher than the second diffusion degree.

7. The display device of claim 1, wherein
   the second brightness is higher than the first brightness,
   the first brightness is higher than a reference brightness, and
   the second diffusion degree is higher than the first diffusion degree.

8. The display device of claim 1, wherein
   the second brightness is lower than the first brightness,
   the first brightness is lower than a reference brightness, and
   the second diffusion degree is higher than the first diffusion degree.

9. The display device of claim 1, wherein
   the first brightness is lower than the second brightness,
   the second brightness is lower than a reference brightness, and
   the first diffusion degree is higher than the second diffusion degree.

10. The display device of claim 3, wherein
    a first length of the first ridge is shorter than a second length of the second ridge.

11. The display device of claim 5, wherein
    a first length of the first ridge is shorter than a second length of the second ridge.

12. The display device of claim 6, wherein
    a first length of the first ridge is shorter than a second length of the second ridge.

13. The display device of claim 7, wherein
    a first length of the first ridge is shorter than a second length of the second ridge.

14. The display device of claim 8, wherein
    a first length of the first ridge is shorter than a second length of the second ridge.

15. The display device of claim 9, wherein
a first length of the first ridge is shorter than a second length of the second ridge.

16. The display device of claim 1, further comprising;
a first light source being surrounded by the first light guide,
a second light source being surrounded by the second light guide,
a third light source being surrounded by the third light guide, and
a fourth light source being surrounded by the fourth light guide.

17. The display device of claim 3, further comprising;
a first light source being surrounded by the first light guide,
a second light source being surrounded by the second light guide,
a third light source being surrounded by the third light guide, and
a fourth light source being surrounded by the fourth light guide.

18. The display device of claim 5, further comprising;
a first light source being surrounded by the first light guide,
a second light source being surrounded by the second light guide,
a third light source being surrounded by the third light guide, and
a fourth light source being surrounded by the fourth light guide.

19. The display device of claim 6, further comprising;
a first light source being surrounded by the first light guide,
a second light source being surrounded by the second light guide,
a third light source being surrounded by the third light guide, and
a fourth light source being surrounded by the fourth light guide.

20. The display device of claim 7, further comprising;
a first light source being surrounded by the first light guide,
a second light source being surrounded by the second light guide,
a third light source being surrounded by the third light guide, and
a fourth light source being surrounded by the fourth light guide.

21. The display device of claim 1, further comprising;
a controller which computes a brightness profile and controls a transmissivity of the display panel,
wherein
the controller corrects the transmissivity at position overlapping the second ridge based on the brightness profile.

* * * * *